Patented Jan. 13, 1931

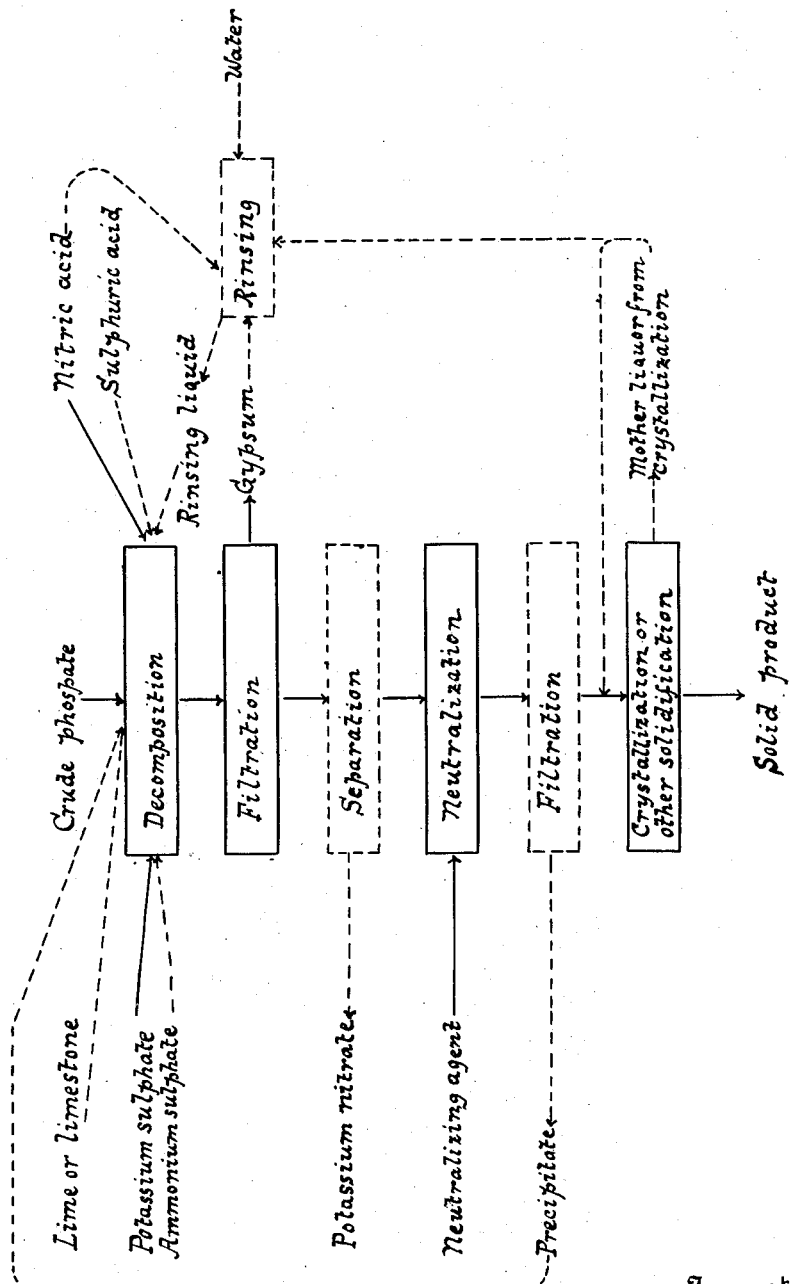

1,788,828

UNITED STATES PATENT OFFICE

REINHARD GOLDBERG, OF LUDWIGSHAFEN-ON-THE-RHINE, AND KARL OTTO SCHMITT, OF OPPAU, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF FERTILIZERS

Application filed February 28, 1928, Serial No. 257,778, and in Germany December 16, 1926.

The present invention relates to improvements in the production of fertilizers, for which an application for patent has been filed in Germany on December 16th, 1926.

Hitherto it has been common practice to produce mixed fertilizers by mixing together the different fertilizing salts in any suitable mixing apparatus. The products obtained in this manner are of rather low value in the case of the employment of salts containing, besides the constituents of fertilizing value, other constituents which have little or no fertilizing action and which therefore are mere ballast, as is the case, for example, with the chlorine atom or sulphate or carbonate radical in potassium chlorid, ammonium sulfate or carbonates. If this drawback is to be avoided, other salts, such as potassium nitrate or phosphate must be employed, the production of which is however rather difficult and expensive. Besides this, the production of such salts yields considerable amounts of by-products which, in most cases, cannot be employed for producing further fertilizing material. Thus, in the production of potassium nitrate from potassium chlorid and sodium nitrate or ammonium nitrate respectively, common salt or ammonium chlorid is obtained, the former not being convertible into fertilizers at all whereas the latter can only be employed to a limited extent. Especially the difficulty of avoiding a reaction between the different constituent salts on account of small quantities of moisture present in the mixture which may lead to partial decomposition or to caking, is a strong drawback against the said methods of production.

We have found that mixed fertilizers which are free from all ballast, and which are not liable to the decomposition mentioned above, are obtained in a single operation by treating crude phosphates in the manner herein specified with nitric acid and potassium sulfate with or without further addition of ammonium sulfate and then neutralizing the resulting mixture. On working in this manner the composition of the product may be varied within wide limits by changing the proportions of the single agents employed in the process. The only by-product which is obtained in the said process consists of gypsum which can be easily removed and converted into ammonium sulfate.

The various features of our process will be fully set forth in the following description and examples. In order to facilitate the understanding of our invention, the process is also illustrated in the accompanying flow sheet, in which the essential steps are indicated by full lines, whereas those steps which may, but must not necessarily, be used in our process, are indicated by dotted lines.

The special feature of the process, which is the subject-matter of the present invention, consists in treating a crude phosphate with nitric acid in a considerably higher amount, such as at least 10 per cent in excess of the amount necessary for the decomposition of the phosphate itself, and with or without addition of sulfuric acid by which addition part of the nitric acid may be saved, all or part of the calcium present being simultaneously precipitated, if desired. The said acids are hereinafter referred to for the sake of brevity as inorganic acids decomposing mineral phosphates. Before or after the said decomposition, potassium sulphate or a mixture thereof with ammonium sulfate are added to the solution. The precipitated gypsum is separated by filtering the solution after the decomposing reaction, whereupon the filtrate is neutralized completely or only to some extent with agents which do not introduce any ballast into the desired finished product. The dry fertilizer is then recovered by cooling or evaporating or spraying the solution or by any other known method.

The said addition of potassium or ammonium sulfate or of both salts is performed, for example, by mixing the crude phosphate with the said salts in the dry state before the decomposition, or the phosphate may be suspended in a solution of the salts, which mixture is then spurted into the nitric acid, while stirring. Or the said salts may be dissolved in the acid before its action upon the phosphate.

It has already been proposed to produce mixed fertilizers by acting upon crude phosphates with an equivalent amount of nitric acid and with alkali metal sulfates and drying and grinding the obtained product. But these fertilizing mixtures contain considerable amounts of gypsum, such as up to 50 per cent of their weight, which is of no fertilizing value. If the gypsum be filtered off in order to improve the quality of the product, large amounts of valuable potassium salts are simultaneously removed, the gypsum forming difficultly soluble double salts with potassium sulfate and also, to some small degree, with ammonium sulfate.

This drawback is avoided in the present process in which considerably larger amounts of nitric acid are employed, such as at least 10 per cent more than correspond to the following formula:

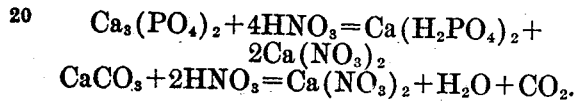

$$Ca_3(PO_4)_2 + 4HNO_3 = Ca(H_2PO_4)_2 + 2Ca(NO_3)_2$$
$$CaCO_3 + 2HNO_3 = Ca(NO_3)_2 + H_2O + CO_2.$$

It is obvious that in every case the content of calcium carbonate in the crude phosphate must be determined before the decomposition, in order to decide the amount of acid required even when the desired products are to contain certain amounts of calcium salts. Working in this manner reduces to a minimum the content of alkali metal sulfate or ammonium sulfate in the gypsum filtered off, no insoluble double salts being formed. The last traces, for example of potassium sulfate, may be removed by rinsing, preferably with a part of the nitric acid prepared for a following decomposition or with the mother liquors obtained after partial crystallization of the concentrated solutions of the product obtained in a prior operation. When working with an excess of nitric acid, filtering off gypsum is made a very easy operation owing to the form of the precipitated gypsum, a strongly adhering mass, which is very easily rinsed, being obtained, especially on working with plunger suction filters.

After separating the gypsum, the solution is neutralized with agents which do not add any ballast to the finished products, as for example with potassium carbonate, caustic potash, lime or ammonia. If ammonia be employed for neutralizing to a certain stage of neutralization, not exceeding the formation of di-ammonium phosphate, practically no phosphate is precipitated, if no calcium is present in the solution. Besides small quantities of gypsum, which is more soluble in an acid than in a neutral solution, only oxids of alumina and iron and mere traces of calcium in the form of its di-phosphate are precipitated. On evaporating or cooling or spraying or on employing several of these means, salts are obtained, the phosphoric acid compounds of which are, for the most part, soluble in water, the rest being soluble in the standard citrate solution; furthermore, this solubility of the salts is retained on drying and extended storing.

According to the composition of the fertilizers desired, potassium or potassium and ammonium sulfate may be employed. The addition of these agents may be performed either in the manner described above or by adding sulfuric acid to the nitric acid and adding the respective bases before or after the decomposition. In order to vary the content of nitrogen or potassium in the desired product, and especially for raising the amount of potassium therein, the crude phosphate may be mixed with lime or limestone, which allows of the employment of larger amounts of potassium sulfate, the sulfuric acid being afterwards removed as gypsum. This operation is very efficient when crude phosphates of a low content of phosphoric acid are to be used, the fertilizer still being of high value. In this case the amount of decomposing acid employed is greater on account of the larger amounts of calcium present. The nitrogen content may be varied also by other modifications of the process, for example by varying the amount of nitric acid employed for the decomposition and the quantity of ammonia which may be used for neutralizing the acid solution. Or the said neutralization may be proceeded with not only up to the stage of the primary but up to that of the secondary phosphate, a hydrogen-ion concentration of from pH=2 to pH=8 being chosen for this purpose. Also the relative proportion of nitrogen in the nitrate form to that in the form of ammonia may be varied in favor of the former by employing lime instead of ammonia for neutralizing, the calcium content being maintained or even diminished, if desired, by raising the amount of potassium sulfate. On the other hand, the calcium content may be raised by reducing the quantity of the added sulfate, the products, nevertheless, possessing a good stability on storage, especially when the amount of added sulfate has been equivalent to the quantity of the employed nitric acid and lime has been employed for neutralizing. By fractional crystallization of the neutralized liquors and by combining the steps of evaporating and cooling, salt mixtures of different compositions may be obtained, the first fractions being richer in potassium, the remainders being richer in phosphate. If, for example, a fertilizer with a particularly high content of phosphoric acid is to be obtained when using potassium sulfate, potassium nitrate may be separated after filtering off gypsum but before neutralizing the solution, the mother liquor being then treated as described before. The potassium nitrate is obtained in a rather high state of purity and without considerable cost. The mother liquors of the first fractions can be directly worked up, but it has been found very suitable to mix them with fresh quantities of the salt solution and work these up together. Or they may be used for rinsing the gypsum precipitate instead of water in a following decomposition. This method of working allows of producing pure fertilizers containing very little ammonium nitrate which property is of great value for securing the stability on storage.

If a fertilizer is to be produced, the phosphoric acid compounds of which are completely soluble in water, the precipitate obtained on neutralization and consisting mainly of metal-phosphates, remainders of gypsum and small quantities of di-calcium phosphate, is filtered off and a solution is obtained which yields a completely water-soluble and neutral pure fertilizer.

The said filtration is a very easy operation if the neutralization be proceeded with rather slowly and on intensely mixing and if a rotating filter be employed. The precipitate on the filter needs no instant rinsing, but it is preferably used in a following process by mixing it with the crude phosphate as soon as it has attained a suitable content of phosphate compounds.

If a fertilizer with a certain content of calcium is to be produced, when employing equivalent amounts of potassium sulfate and nitric acid as described above, the salts consist mainly of potassium nitrate and di-calcium phosphate, which latter salt may be separated by filtration as a by-product, a completely water-soluble fertilizer being obtained from the solution.

The fertilizers obtained in the process described above possess an excellent stability on storage, even when they contain some ammonium nitrate, and do not tend to cake.

The following examples will further illustrate the nature of the said invention which however is not limited thereto—

Example 1

100 kilograms of a morocco phosphate (containing 33 per cent of $P_2O_5$ and 49 per cent of CaO) are suspended in 180 liters of water, which has been employed for rinsing the gypsum obtained in a previous operation, and are mixed with 130 liters of 61 per cent nitric acid. By heating for about 2 to 3 hours to about 80° to 90° C, the decomposition is completed and 160 kilograms of potassium sulfate (with 45 per cent of $K_2O$) are added, while intensely stirring. After about 2 hours, the gypsum is removed by suction and is rinsed with 150 liters of water of about 70° C. The solution is then neutralized, 30 liters of a solution of ammonia of 24 per cent strength by volume being required until the color of methyl orange changes from red to yellow. The neutral solution is then evaporated at reduced pressure until a consistency is reached which still allows of spraying by means of compressed air. The yield of salts amounts to 240 kilograms containing 13 per cent $P_2O_5$, 9.8 per cent being soluble in water and 3.2 per cent in the standard citrate solution. Besides this, there are present 26 per cent of $K_2O$, 9.5 per cent of nitrogen in form of nitrate and 2.5 per cent of nitrogen in form of ammonia, 9 per cent of water and only 2.4 per cent of CaO and 3.3 per cent of $SO_4$. The composition of the salts corresponds to a relative proportion by weight of $N:P_2O_5:K_2O = 1:1:2$.

Example 2

For the production of a fertilizer completely soluble in water containing ingredients which correspond to a proportion of $N:P_2O_5:K_2O = 1:0.75:1.25$, 75 kilograms of morocco phosphate are suspended in 200 liters of water, which have been employed for rinsing the gypsum of a previous operation, and are decomposed with 106.5 liters of 61 per cent nitric acid as described in Example 1. After the reaction, 85 kilograms of potassium sulphate and 31 kilograms of ammonium sulfate are added, whereupon the mixture is stirred for 1 hour at 90° C. The gypsum is filtered off, while hot, and is rinsed with 120 liters of water after which procedure it contains only 0.85 per cent of $K_2O$ and 0.5 per cent of $P_2O_5$. The filtrate is neutralized with a solution of 24 per cent by volume of ammonia, 30 liters thereof being used until the color change of methyl orange is attained. After removing the precipitate arisen on neutralization, by means of a rotating filter, the solution is evaporated at reduced pressure, 180 kilograms of a completely soluble fertilizer being obtained, which contains 17.5 per cent of nitrogen (10.5 per cent in the form of nitrate), 13 per cent $P_2O_5$ of which only 0.1 per cent is soluble in the standard citrate solution, and 21 per cent of $K_2O$.

Example 3

A water-soluble fertilizer with a relative proportion of its constituents of $$N:P_2O_5:K_2O = 1:0.9:3$$

is simultaneously obtained together with a mixture with a relative proportion of its constituents of $N:P_2O_5:K_2O = 1:1.2:2.4$ by the following process. 200 kilograms of a crude phosphate (containing 33 per cent of $P_2O_5$) are decomposed with 360 liters of 45 per cent nitric acid diluted with 200 liters of water, whereupon the mixture is converted at from 90° to 100° C. with 350 kilograms of potassium sulfate. After filtering off the precipitated gypsum, the filtrate is neutralized with ammonia until methyl orange changes its color, and filtered again. After evaporating 250 liters of water from the solution, 245 kilograms fertilizing salts crystallize from the solution on cooling to about 35° C. which are filtered off and dried. The salts thus obtained contain 36.4 per cent of $K_2O$, 11 per cent of water-soluble $P_2O_5$, 12 per cent of nitrogen (2.1 per cent in the form of ammonia) and only 0.93 per cent of CaO. The mother liquor is further evaporated and then sprayed, a mixture being obtained which contains after drying 16.5 per cent of $P_2O_5$, 33.5 per cent of $K_2O$, 11.4 per cent of nitrogen as nitrate and 2.5 per cent of nitrogen as ammonia, the yield amounting to 200 kilograms.

*Example 4*

In order to produce a fertilizer completely soluble in water with a relative proportion of its constituents of $N:P_2O_5:K_2O = 1:0.75:1.75$, 75 kilograms of a crude phosphate (containing 33 per cent of $P_2O_5$) are decomposed at 60° C. with 95 liters of 61 per cent nitric acid in mixture with 200 liters of water. 108.75 kilograms of potassium sulfate and 9 kilograms of ammonium sulfate are added, while intensely stirring and raising the temperature to from 80° to 90° C. After 1 hour, the mixture is filtered by suction, neutralized with 45 liters of an aqueous solution of ammonia (spec. gravity: 0.91) and filtered again. The resulting solution is evaporated by heating to 120° C. and sprayed by means of compressed air. The obtained salts contain, in the dry state, 10.3 per cent of nitrogen as nitrate, 5.7 per cent of nitrogen as ammonia, 12.4 per cent of $P_2O_5$ and 28 per cent of $K_2O$, a yield of 170 kilograms being obtained.

*Example 5*

100 kilograms of a morocco phosphate (containing about 33 per cent of $P_2O_5$) are suspended in 150 liters of rinsing liquor from a previous operation and are decomposed with 160 kilograms of 61 per cent nitric acid, whereupon 75 kilograms of potassium sulfate and 40 kilograms of ammonium sulfate are added. Precipitated gypsum is then separated and rinsed with 120 liters of hot water. The filtrate is neutralized with 12.5 kilograms of calcium carbonate and evaporated so far as to allow of obtaining a dry salt on spraying. The product obtained contains the fertilizing components in a relative proportion of $N:P_2O_5:K_2O:CaO = 1:1:1.2:0.5$.

*Example 6*

100 kilograms of a crude phosphate with a content of 30 per cent of $P_2O_5$ and 53 per cent of CaO are, after mixing and stirring with 125 liters of water decomposed with 125 liters of 61 per cent nitric acid and converted with 95 kilograms of potassium sulfate. The precipitated gypsum is filtered off, and the filtrate is neutralized with 16 liters of a solution of 24 per cent by volume of ammonia, most of the phosphate being precipitated thereon. After evaporating the dissolving water, a fertilizing salt is obtained the relative proportion of its constituents corresponds to $N:P_2O_5:K_2O:Ca = 1:1.2:2:1$.

What we claim is:

1. The process of producing ballast-free fertilizers which comprises decomposing crude phosphate with nitric acid, at least 10 per cent in excess of the amount required for decomposition, and adding potassium sulphate, then filtering off gypsum, and at least partly neutralizing the solution with an agent not introducing ballast.

2. The process of producing ballast-free fertilizers which comprises decomposing crude phosphate with nitric acid and sulphuric acid, said acids being employed in an amount, at least 10 per cent in excess of the amount required for decomposition, and adding potassium sulphate, then filtering off gypsum, and at least partly neutralizing the solution with an agent not introducing ballast.

3. The process of producing ballast-free fertilizers which comprises decomposing crude phosphate with nitric acid, at least 10 per cent in excess of the amount required for decomposition, and adding potassium sulphate and ammonium sulphate, then filtering off gypsum, and at least partly neutralizing the solution with an agent not introducing ballast.

4. The process of producing ballast-free fertilizers which comprises decomposing crude phosphate with nitric acid, at least 10 per cent in excess of the amount required for decomposition, then adding potassium sulphate, then filtering off gypsum, and at least partly neutralizing the solution with an agent not introducing ballast.

5. The process of producing ballast-free fertilizers which comprises decomposing crude phosphate with nitric acid, at least 10 per cent in excess of the amount required for decomposition, then adding potassium sulphate, then filtering off gypsum, and at least partly neutralizing the solution with ammonia.

6. The process of producing ballast-free fertilizers which comprises decomposing crude phosphate with nitric acid, at least 10 per cent in excess of the amount required for decomposition, then adding potassium sulphate, then filtering off gypsum, and at least partly neutralizing the solution with ammonia and filtering again.

In testimony whereof we have hereunto set our hands.

REINHARD GOLDBERG.
KARL OTTO SCHMITT.